United States Patent
Kerkhof et al.

(10) Patent No.: US 9,635,970 B2
(45) Date of Patent: May 2, 2017

(54) TOOL FOR SEPARATING FLESH FROM A CORE AND A RIND OF A FRUIT

(75) Inventors: Patrick Lambertus Kerkhof, LX Zoetermeer (NL); Eelco Jan Gerardus Witteveen, RA Schiedam (NL); Jasper Wilhelmus Petrus Van Winden, ZK Delft (NL); Rui Medeiros Santos, Delfgauw (NL)

(73) Assignee: BIN Innovations B.V., Delfgauw (NL)

( * ) Notice: Subject to any disclaimer, the term of this patent is extended or adjusted under 35 U.S.C. 154(b) by 306 days.

(21) Appl. No.: 13/884,944

(22) PCT Filed: Nov. 11, 2011

(86) PCT No.: PCT/NL2011/050771
§ 371 (c)(1),
(2), (4) Date: Jul. 29, 2013

(87) PCT Pub. No.: WO2012/064192
PCT Pub. Date: May 18, 2012

(65) Prior Publication Data
US 2013/0291387 A1    Nov. 7, 2013

(30) Foreign Application Priority Data

Nov. 12, 2010 (NL) .................................. 1038380
Mar. 18, 2011 (NL) .................................. 2006422

(51) Int. Cl.
*A47J 25/00* (2006.01)
*A47J 17/02* (2006.01)

(52) U.S. Cl.
CPC ............... *A47J 17/02* (2013.01); *A47J 25/00* (2013.01); *Y10T 83/04* (2015.04)

(58) Field of Classification Search
CPC .............................. A47J 25/00; A21C 11/106
(Continued)

(56) References Cited

U.S. PATENT DOCUMENTS 2,397,007 A    3/1946    Hosmer
2,733,746 A  * 2/1956    Rauner ........................... 99/508
(Continued)

FOREIGN PATENT DOCUMENTS

CN    201033442 Y    3/2008
CN    201167830 Y    12/2008
(Continued)

OTHER PUBLICATIONS

NPL_1 (LyricalGwen "Pineapple Coring Lesson" uploaded on Aug. 6, 2009 https://www.youtube.com/watch?v=N-FFVG-NtuQ).*

*Primary Examiner* — Sean Michalski
*Assistant Examiner* — Liang Dong
(74) *Attorney, Agent, or Firm* — Kilpatrick Townsend & Stockton LLP

(57) ABSTRACT

A tool (1) for separating flesh from a core and a rind of a fruit, in particular a pineapple, comprising: a corer (10) that, op opposite ends, is provided with a driving member (40) and a cutting edge (12); a flesh cutter (20) extending radially on the corer and having at least one cutting edge (22), wherein the shape of the flesh cutter is such that upon rotation it executes a helical movement with a predetermined pitch; a rind cutter (30), provided at an outer end of the flesh cutter and extending parallel to the corer, said rind cutter including a cutting edge (32). The tool further comprises a section cutter (60), including an annular hub (62) configured to be slidingly received on the corer, an annular rim (66), and one or more spokes (64) radiating from the hub and interconnecting the hub and the rim.

10 Claims, 3 Drawing Sheets

(58) Field of Classification Search
USPC .............. 30/113.1, 113.2, 113.3, 130, 316; 99/542–544, 547, 551
See application file for complete search history.

(56) References Cited

U.S. PATENT DOCUMENTS

| | | | |
|---|---|---|---|
| 3,128,810 A | | 4/1964 | Whipp |
| D355,339 S | * | 2/1995 | Aulbers et al. ................ D7/696 |
| 5,845,898 A | * | 12/1998 | Halder et al. ................ 269/48.1 |
| D432,874 S | * | 10/2000 | Kari ............................... D7/673 |
| 2009/0205514 A1 | | 8/2009 | Cheng |
| 2009/0241344 A1 | | 10/2009 | Mastroianni |
| 2010/0263212 A1 | * | 10/2010 | Settele ................... A47J 25/00 30/113.1 |

FOREIGN PATENT DOCUMENTS

| | | |
|---|---|---|
| CN | 201376290 Y | 1/2010 |
| CN | 201426624 Y | 3/2010 |
| EP | 0483930 A1 | 5/1992 |
| EP | 2090410 A1 | 8/2009 |
| JP | S48-077493 | 12/1971 |
| JP | S58-188718 U | 12/1983 |
| JP | 2009172334 A | 8/2009 |
| NL | 9002385 A | 6/1992 |

* cited by examiner

TOOL FOR SEPARATING FLESH FROM A CORE AND A RIND OF A FRUIT

This application is a U.S. National Phase under 35 USC 371 of PCT Application No. PCT/NL2011/050771 filed Nov. 11, 2011, which claims priority to the Netherlands Application No. 2006422, filed Mar. 18, 2011, which claims priority to Netherlands Application No. 1038380, filed on Nov. 12, 2010, the disclosures of which are incorporated by reference herein.

FIELD OF THE INVENTION

The present invention relates to a tool for separating flesh from a core and a rind of a fruit, in particular a pineapple.

BACKGROUND

EP 0,483,930-B1 discloses a tool for separating a core, a rind and flesh of a fruit, in particular a pineapple. The tool comprises a cylindrical corer which is provided at one end with a cutting edge and at the other end with a handle or other driving member, such as a motor. The tool is characterized in that there is provided, close to the cutting edge of the corer at least one flesh cutter that extends radially thereon, and that is provided with at least one cutting edge. The shape of the flesh cutter is chosen such that upon rotating the tool, it executes a helical movement with a predetermined pitch. At the end of the flesh cutter, opposite the end fixed to the corer, there is provided, at least locally, a rind cutter that extends parallel to the corer and that is provided with at least one cutting edge.

Use of the tool according to EP'930 to bore out a pineapple entails removing an end of the pineapple, driving the tool into the flesh of the pineapple like a corkscrew, and pulling the tool out of the shell to separate the flesh from the rind and the core. The helically cut out string of flesh then rests on the flesh cutter, and around the corer. At this point a user has two alternative options to remove the flesh from the tool.

According to a first option the user may detach the handle from the corer, and subsequently turn the corer upside-down. The flesh will then slide off the corer onto a plate or working surface, on which it may be divided up into segments by suitably cutting it with a knife. According to a second option, the user may use a knife to cut the helical string of flesh lengthwise, i.e. along the axial direction of the corer, while it still rests on the flesh cutter. For preparing sections or chunks of flesh (instead of slices), multiple lengthwise cuts will be necessary, the number of required cuts depending on the desired dimensions of the sections.

Both the first and second option entail drawbacks. The first option, for example, requires the relatively heavy pineapple flesh, which may easily have a mass of 1-3 kg, to be turned. This is somewhat clumsy, and may even be difficult for some people. In addition, cutting the freestanding, slippery and unstable helix of flesh into equally sized and/or shaped chunks is not easy and potentially dangerous. The second option may likewise give rise to dangerous situations because it requires a certain dexterity to controllably apply lengthwise cuts. In particular in case multiple cuts are desired, one might be tempted to hold the flesh with one hand to prevent segments of flesh from sliding relative to each other or falling off the tool, while cutting the flesh with the sharp tip of a knife using the other hand.

It is an object of the present invention to overcome or mitigate these drawbacks associated with the tool known from EP'930.

SUMMARY OF THE INVENTION

One aspect of the present invention is directed to a tool for separating flesh from a core and a rind of a fruit, in particular a pineapple. The tool may include a cylinder jacket-shaped corer having a first end and a second end, said first end being provided with a driving member and said second end being provided with a cutting edge. The tool may further include a flesh cutter extending radially on the corer at or near the second end thereof, and having at least one cutting edge, wherein the shape of the flesh cutter is such that upon rotation of the tool within a fruit it execute a helical movement with a predetermined pitch. The tool may also comprise a rind cutter, provided at a radially outer end of the flesh cutter and extending parallel to the corer, said rind cutter including a cutting edge. The tool may be characterized in that it includes a section cutter. The section cutter may include an annular hub that is configured to be slidingly received on the corer, an annular rim, and one or more spokes radiating from the hub and interconnecting the hub and the rim.

Another aspect of the present invention is directed to a section cutter configured for cooperation with a tool for separating flesh from a core and a rind of a fruit, in particular a pineapple. The section cutter may comprise an annular hub configured to be slidingly received on a cylinder jacket-shaped corer of the tool, an annular rim, and a plurality of spokes radiating from the hub and interconnecting the hub and the rim.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1C:
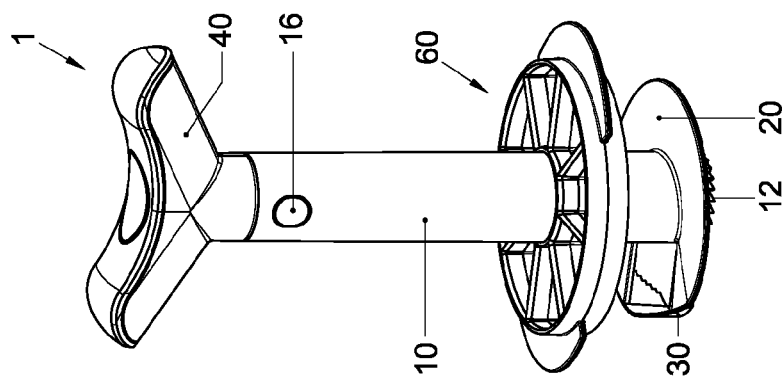
FIGS. 1A-C schematically illustrate in three perspective views an exemplary embodiment of the tool according to the present invention, and the manner in which a section cutter may be slidably mounted on the corer of the tool.
Figure 1B:
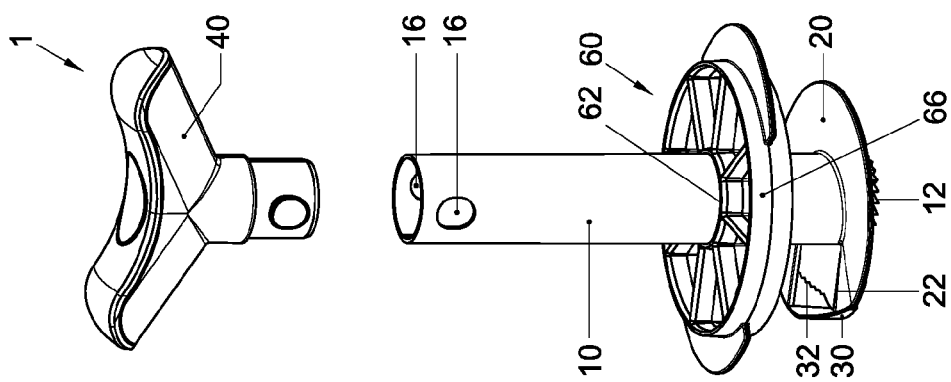
Figure 1A:
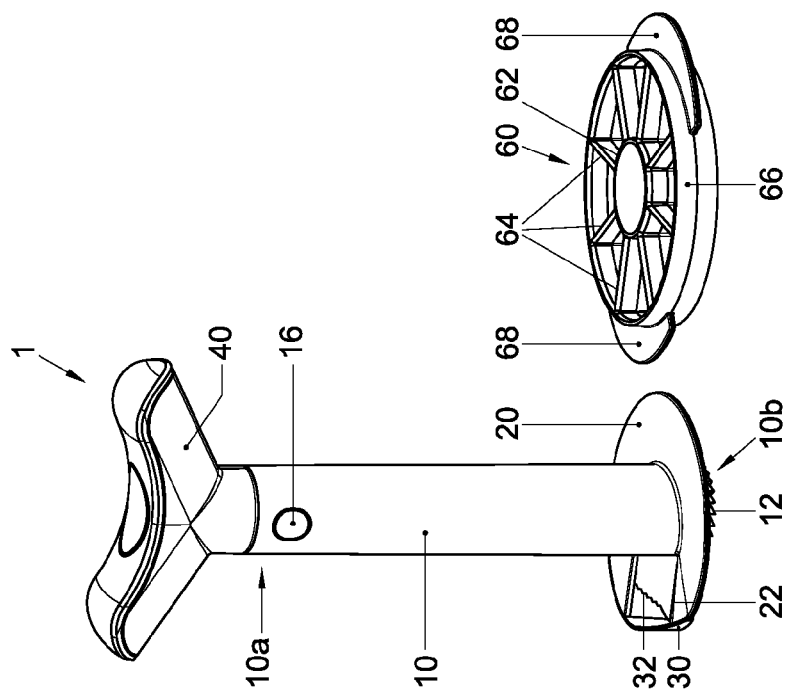

FIGS. 1A-C schematically illustrate in three perspective views an exemplary embodiment of the tool 1 according to the present invention. The tool 1 may comprise a corer 10 provided with a driving member 40, a flesh cutter 20, a rind cutter 30 and a section cutter 60, which elements will now in turn be briefly elucidated with reference to the exemplary embodiment shown in FIGS. 1A-C.

The corer 10 of the tool 1 may include an elongate, cylinder jacket-shaped body having a first end 10*a* and a second end 10*b*. Both ends 10*a*, 10*b* may be open so as to allow the first end 10a to receive a connecting portion of a driving member 40, e.g. a handle or a drive axle of a motor, and to allow the second end 10b to receive a core of a fruit that is being processed. To facilitate driving the tool 1, and in particular the second end 10b thereof, into a fruit, the second end 10b may be provided with a cutting edge 12. The cutting edge 12 may extend along at least a portion of a circumferential edge of the second end 10b of the corer 10, and be either plain or serrated.

Near its first end 10a, the corer 10 may include one or more apertures (not shown) to prevent the drawing of a vacuum when the tool 1 is pulled from the rind and core of a fruit to extract its flesh. Such apertures may preferably be provided at a distance from the second end 10b of the corer 10 that is somewhat larger than the length/depth of the fruits to be processed therewith.

The corer 10 may further be provided with a scale in order to facilitate determining the bore(d) depth and possibly the number of turns or slices of flesh being or to be cut out. Using such a scale, it may for example be possible to place the tool 1 next to a fruit before boring and to read off the boring depth, e.g. the number of turns. This may prevent accidentally boring through a bottom of the fruit.

As mentioned, the first end 10a of the corer 10 may be provided with a driving member 40, which driving member may be connected to the corer by means of fixing apertures 16 provided therein. When the tool 1 is configured for domestic use, the driving member may typically take the form of a handle, as shown in FIGS. 1A-C. The handle 40 may be detachably connectable to the corer 10, for instance to allow it to be used with different corers 10 having differently sized flesh cutters 20 and corresponding section cutters 60, and/or to allow the tool 1 to be disassembled for storage and cleaning. The sequence of FIGS. 1A-C demonstrates how a section cutter 60 may be mounted on the corer 10 of the tool 1 by disconnecting the handle 40 therefrom, sliding the section cutter 60 onto the corer 10, and reconnecting the handle 40 to the corer. The section cutter 60 may again be separated from the corer by executing these steps in reverse. Below, the construction of an advantageous embodiment of a handle 40 will be elaborated upon in more detail with reference to FIGS. 3A-C.

The flesh cutter 20 may be connected to the corer 10, at or near the second end 10b thereof, and extend substantially radially therefrom. That is, the flesh cutter 20 may extend generally away/radiate from the corer 10, without being required to extend perpendicular thereto. In the depicted embodiment the flesh cutter 20 extends helically around the corer 10 to fill exactly one complete turn or circle (as seen in a view along the longitudinal axis of the corer). In other embodiments, the flesh cutter 20 may extend more or less than one turn around the corer 10. In particular when the tool includes one or more relatively small, radially extending flesh cutters 20 it may be advantageous to hingeably connect the flesh cutter(s) to the corer 10 by means of suitable hinge means, so as to enable the flesh cutter(s) to be collapsed against, or into recesses provided in, the corer for convenient storage. Alternatively or in addition, the flesh cutter(s) may be connected to the corer 10 through a substantially radially extending rotation axis that allows a pitch (angle) of the flesh cutter(s) to be adjusted. A flesh cutter 20 may be fixedly or detachably connected to the corer 10. Detachably connectable flesh cutters 20 may be offered in a range of diameters, allowing a user to select the flesh cutter 20 with a diameter appropriate to bore out a fruit at hand.

The flesh cutter 20 may include at least one cutting edge 22. As in the depicted embodiment, the cutting edge 22 may be formed by a lower, radially extending plain or serrated edge of the flesh cutter 20. The shape of the depicted flesh cutter 20 is chosen such that (i) upon rotation of the tool within a fruit, i.e. with the flesh cutter 20 at least partially residing within the flesh of a fruit, the tool execute a helical movement with a predetermined pitch, and (ii) a helical string of cut out flesh is supported at its entire bottomside by the upper surface of the flesh cutter. It will be clear that the pitch of the flesh cutter 20 may determine the thickness of the string of flesh to be cut out.

In a preferred embodiment of the tool 1, the pitch defined by the flesh cutter 20 may be related to the serration coarseness of the cutting edge 12 of the corer 10, such that a ratio between an axial length/height of the serrations or denticles of the cutting edge 12 and the pitch of the flesh cutter 20—both measured in the same units—is in the range of 5.5 to 7.5, with the number of serrations on the cutting edge 12 being in the range of 22-24. These parameters have been found to provide for a tool 1 that may be driven smoothly into the flesh of a fruit while no more than a reasonable force needs to be applied to the handle 40, and that actually cuts the flesh instead of grinding and damaging it.

The tool 1 may further include a rind cutter 30, which may be provided at a radially outer end of the flesh cutter 20 and extend parallel to corer 10. In the depicted embodiment, the rind cutter 30 interconnects the radially outward circumferential edge portions of the flesh cutter 20 at both ends of the turn that it makes around the corer 10. In another embodiment, the rind cutter 30 may extend from the radially outward circumferential edge of the flesh cutter 20 into a direction parallel to the corer 10, along a portion or the entire length of said edge. The rind cutter 30 may be provided with a plain or serrated cutting edge 32, which may face in the same tangential direction as the cutting edge 22 of the flesh cutter 20.

The tool 1 may also include a section cutter 60. The section cutter 60 may include an annular hub 62 that is configured to be slidingly received on the corer 10. The annular hub 62 may preferably include a circular guide ring having an inner diameter that is only slightly larger than an outside diameter of the corer 10. If the inner diameter of the guide ring is too small compared to the outer diameter of the corer 10, it may be difficult to slide the section cutter 60 along the corer (and through the cut out flesh) due to friction, for example as a result of slanting. If the inner diameter of the guide ring is too large relative to the outer diameter of the corer 10, too much play between the hub 62 and the corer 10 may cause the section cutter 60 to slide erratically in a radial direction and keep it from smoothly cutting through the flesh. To prevent these issues, the inner diameter of the ring of the hub 62 may preferably be 0.5-3 mm larger than an outside diameter of the corer 10. Furthermore, to enable smooth cutting with the section cutter 60 the guide ring of the hub 62 may have a relatively small radial thickness of preferably less than 5 mm.

The section cutter 60 may further include an annular rim 66, and one or more spokes 64 that radiate from the hub 62 and that interconnect the hub 62 and the rim 66. The rim 66 may preferably include a circular ring whose inner diameter may be related to the inner diameter of a path described by the rind cutter 30 (as seen in a view along the longitudinal axis of the corer 10) upon rotation of the tool 1. In case the inner diameter of the rim 66 would be equal to or smaller than the inner diameter of said path, it would be difficult to force the section cutter 60 through the cut out flesh of a fruit. Moreover, it would most likely entail wasting an outer portion of the cut out flesh. However, even in case the inner diameter of the rim 66 would be marginally larger than the inner diameter of said path, warping and radial sliding of the flesh during sectioning thereof could cause the flesh to block the sliding and cutting motion of the section cutter 60. It has been found that a rim 66 having an inner diameter that is at least 5 mm larger than an inner diameter of a path described by the rind cutter 30 upon rotation of the tool 1 does not exhibit these aforementioned problems.

The spokes 64 that interconnect the hub 62 and the rim 66 may be formed as thin rods, or as lamellae or blades that extend parallel to the longitudinal axis of the corer 10. In preferred embodiments, the spokes 64 may be straight or flat; in other embodiments, they may have a curved or otherwise shaped profile. Functionally, the spokes 64 serve as the actual cutting knives of the section cutter 60. Accordingly, their radially extending edges may be sharpened. The number of spokes 64 in a section cutter 60 may vary for different embodiments. A section cutter 60 having only one spoke, for example, may be used to cut the helical string of flesh into slices. More generally, an alternative section cutter 60 having a multiple of N spokes 64 may be used to section each turn of the helical string of flesh into a multiple of N sections.

It seems most practical to manufacture both the hub 62 and the rim 66 of the section cutter 60 as substantially circular rings. Nevertheless, it is contemplated that at least one of the hub 62 and the rim 66 may have a different shape. For instance, in one embodiment of the tool 1 the rim 66 may be formed by a plurality of curved segments, each of which connects the radially outer ends of adjacent spokes, so as to give the section cutter 60 the appearance of a flower. In this regard, the term 'rim' may be construed to mean each of the typically curved parts that collectively form the outer edge of the cutter 60 which is connected to the hub 62 through the one or more spokes 64, and additionally this edge as a whole. The same applies mutatis mutandis to the term 'hub'. Furthermore, 'the diameter' of the hub 62 or the rim 66 may in such cases of non-circular geometry be construed as 'the average diameter'.

The section cutter 60 may be manufactured entirely from plastic, for example by means of injection molding. Alternatively, the hub 62 and the rim 66 may be manufactured from plastic, while the spokes 64 may be formed as metal, e.g. stainless-steel, blades. In yet another embodiment, the section cutter 60 may be formed entirely from metal.

According to an elaboration of the invention, the annular rim 66 may include two diametrically disposed, radially outwardly extending handles 68. The handles 68 may facilitate taking hold of the section cutter 60 with two hands, and applying force to slide it down along the corer 10 to cut flesh that was extracted from a fruit.

Now that the construction of the tool according to the present invention has been described in some detail, attention is invited to the operation thereof. This operation will be illustrated with reference to FIGS. 2A-D, which show how a pineapple 70 may be bored out and how its flesh may be sectioned using the tool 1 assembled as shown in FIG. 1C.

Before applying the tool 1 the crown of the pineapple 70 may be cut off with a knife. Then the tool 1 may be placed on top of the flesh body of the pineapple 70, such that the corer 10 extends in line with the core thereof. See FIG. 2A. Subsequently, the tool 1 may be driven or screwed into the flesh of the pineapple 70 by rotating the handle 40 in the direction R indicated by an arrow shown above the tool 1; each complete rotation of the handle 40 corresponds to one coil of cut out flesh. Note that the section cutter 60 is not forced into the flesh of the pineapple 70 by the rotation of the handle 40. Instead, it continues to rest on top of the pineapple 70 while the corer 10 slides through its hub 62. See FIG. 2B. Once a desired number of coils of flesh have been cut out, the tool 1 may be withdrawn from the pineapple 70 so as to separate a helical string of flesh 76 from the rind 74 and the core (not shown). See FIG. 2C. Any juice formed during the hollowing-out operation remains inside the rind 72 or shell of the pineapple 70 and is thus available for further use; similarly, the rind 72 itself is also preserved for later use as, for instance, a decorative dessert or drink bowl. As a last step, the section cutter 60—which until this point has remained to rest on the top coil of the string of flesh 76—may be slid down along the corer 10, towards the second end 10b thereof in order to section the string of flesh in 76. During the downward sliding motion of the section cutter 60, the corer 10 around which the hub 62 of the cutter 60 is mounted serves as a guide that prevents the section cutter 60 from accidentally slipping in a radial direction. Furthermore, the corer 10 also holds the yet unsectioned helical portion of the string of flesh 76 in place, which makes it particularly easy to section the string in of flesh 76 in equally sized chunks with a single, smooth movement of the section cutter 60.

It may be noted that using the embodiment of the tool 1 shown in FIGS. 1A-C and 2A-D, it may be difficult to section the last turn of flesh 76, i.e. the turn of flesh resting immediately upon an upper surface of the flesh cutter 20. This is a consequence of the fact that the depicted flesh cutter 20 extends helically around the corer 10, while the lower 'side' of the section cutter 60 is flat and configured to cut on a planar surface. To overcome this problem, the lower side of the section cutter 60 may in one embodiment of the tool 1 be shaped complementary to the upper surface of the flesh cutter 20, such that all spokes 64 of the section cutter may be brought into contact with the upper surface of the flesh cutter 60 simultaneously. I.e. the (lower) radially extending edges of the spokes 64 may together define a smooth helical surface similar to the upper surface of the flesh cutter 20.

Figure 2D:
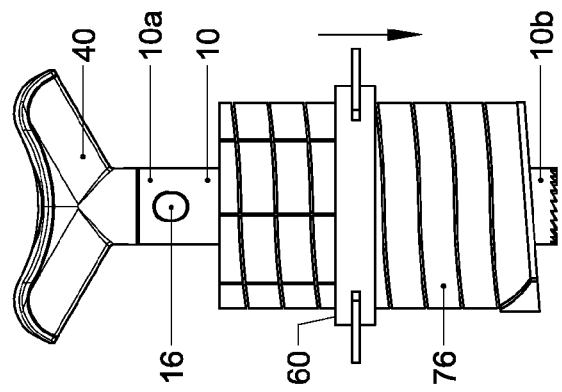
FIGS. 2A-D schematically illustrate in four consecutive side views how the exemplary embodiment of the tool shown in FIGS. 1A-C may be used to separate the flesh from a rind and a core of a pineapple, and to section the flesh afterwards.
Figure 2C:
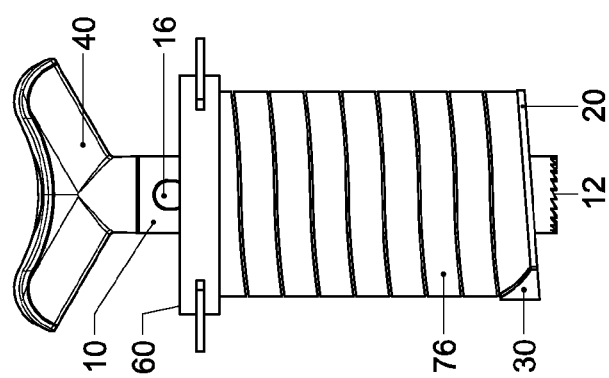
Figure 2B:
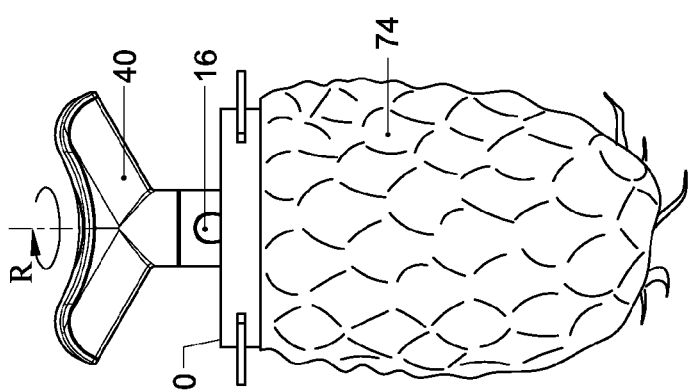
Figure 2A:
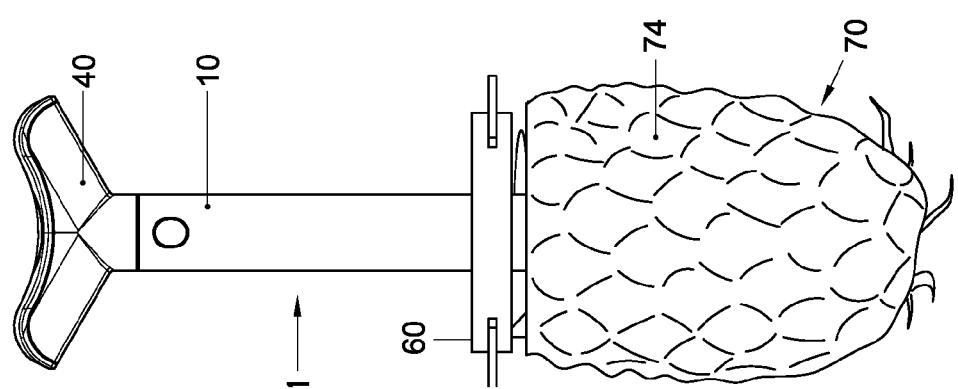

To cut the flesh 76 as shown in FIG. 2D, it may be easiest to slide the section cutter 60 down the corer 10 with two hands. In doing so, however, the handle 40 may awkwardly sit in the way. For this and other reasons, it may be advantageous to have a handle 40 that is detachable from the corer 10, and that is constructed in such a way that it may be disconnected from the corer even when the fixing apertures 16 provided therein are inaccessible, for example because they are blocked by flesh 76 and/or the section cutter 60 (cf. FIGS. 2B-C). The construction and operation of an exemplary embodiment of such a handle 40 will be illustrated with reference to FIGS. 3A-C.

In the orientation shown, the handle 40 may include a housing comprising a grip 42 and a substantially hollow shaft 44. The shaft 44 may extend axially through the grip 52, and be configured to be connectable to the first end 10a of the corer 10 such that (the longitudinal axes of) the shaft and the corer align. For this purpose a free, lower end of the shaft 44 may have an outer diameter that is slightly smaller than an inner diameter of the corer 10, so as to enable this free end to be inserted into the upper end 10a of the corer 10. The lower end of the shaft 44 may further be provided with two apertures 45 that, upon insertion of the lower end of the shaft 44 into the corer 10, register with the fixing apertures 16 provided in the latter.

The handle 40 may also comprise an actuator 46 and a resilient member 52. The actuator 46 may be substantially U-shaped, whereas the resilient member 52 may be substantially V-shaped and be provided with end or locking portions 54 that are shaped for locking engagement with the fixing apertures 16. Both the actuator 46 and the resilient member 52 may be at least partially received within the hollow shaft 44 of the handle 40 in an upside-down orientation. The U-shaped actuator 46 may be disposed over the V-shaped resilient member 52, such that the vertex of the V-shaped resilient member 52 is received in between the legs 48 of the U-shaped actuator 46, and an upper or head portion 50 of the actuator is accessible to a user at the upper end of the shaft 44, i.e. at the upper side of the grip 42 of the handle 40.

Figure 3A:
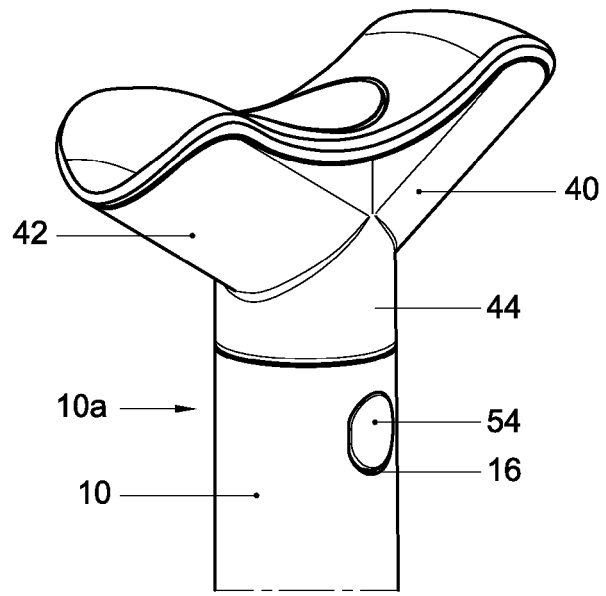
FIGS. 3A-C schematically illustrate in one normal perspective view and two cross-sectional perspective views the construction and operation of an exemplary embodiment of a handle of the tool shown in FIGS. 1A-C and 2A-D.
Figure 3B:
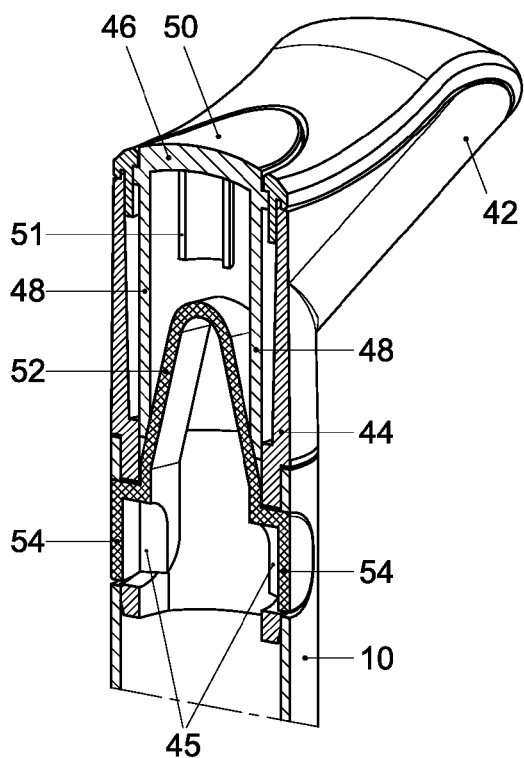

When the corer 10 and the handle 40 of a tool 1 are connected as depicted in depicted in FIG. 3B, and the actuator 46 is pressed downwards in the axial direction of the shaft 44 and the corer 10, the legs 48 of the actuator slide downwards over the V-shaped resilient member 52. This presses the legs of the resilient member 52 together, and forces the end portions 54 of the resilient member inwards and out of engagement with the fixing apertures 16 of the corer 10. In this condition, the handle 40 is no longer locked to the corer 10, and may be separated therefrom (cf. FIG. 1B). When the downward pressure on the head portion 50 of the U-shaped actuator is released, the resilient member 52 will again spread its legs, forcing its end portions 52 outward and the actuator 46 upwards to its starting position.

Figure 3C:
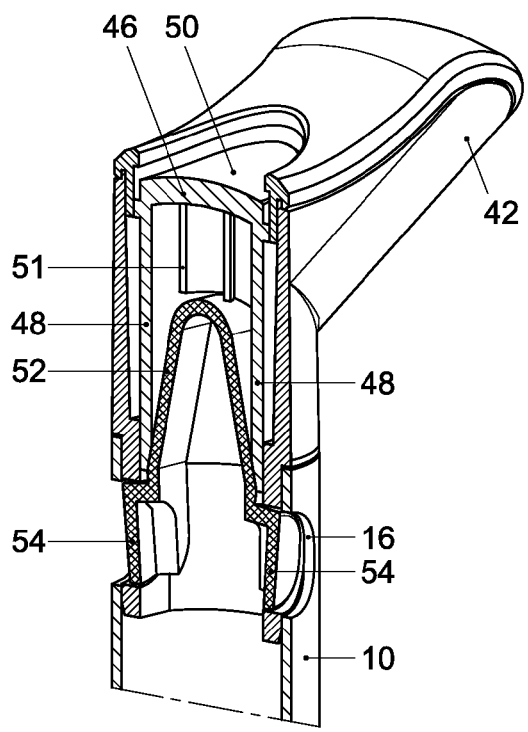

It is understood that the embodiment of the handle 40 depicted in FIGS. 3A-C is merely exemplary. It may be adapted or even simplified without loss of effect (including the operability of a fixing aperture 16 engaging feature (here: locking portions 54) from a top side of the handle 40). In an alternative embodiment the actuator 46 and the flexible member 52 may for example be integrated into a single component.

The tool according to the invention is suitable for domestic use as well as for industrial use in automated operations, since the actions required for extracting the flesh from a fruit and subsequently sectioning it are relatively simple. The canning industry especially may be considered in this connection.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 tool
10 corer
10a,b first (a) and second (b) end of corer
12 cutting edge of corer
16 fixing aperture in corer
20 flesh cutter
22 cutting edge of flesh cutter
30 rind cutter
32 cutting edge of rind cutter
40 driving member/handle
42 grip
44 shaft
45 aperture in shaft
46 actuator
48 actuator leg
50 actuator head
52 resilient member
54 end/locking portions of resilient member
60 section cutter
62 hub
64 spoke
66 rim
68 handle of section cutter
70 pineapple
74 rind
76 flesh
R direction of rotation of the tool when it is driven into the fruit

The invention claimed is:

1. A tool for separating flesh from a core and a rind of a fruit, in particular a pineapple, comprising:
 a cylinder jacket-shaped corer having a first end and a second end, said first end being provided with a driving member and said second end being provided with a cutting edge;
 a flesh cutter extending substantially radially on the corer at or near the second end thereof, and having at least one cutting edge, wherein the shape of the flesh cutter is such that upon rotation of the tool within a pineapple, the flesh cutter executes a helical movement with a predetermined pitch; and
 a rind cutter, provided at a radially outer end of the flesh cutter and extending parallel to the corer, said rind cutter including a cutting edge;
 wherein the tool further comprises:
 a section cutter, including:
  an annular hub mounted on the corer between the driver member and the flesh cutter and configured to slide between the driver member and the flesh cutter, and configured to serve as a guide for the section cutter;
  an annular rim; and
  one or more spokes radiating from the hub and interconnecting the hub and the rim.

2. The tool according to claim 1, wherein at least one of the annular hub and the annular rim is substantially circular.

3. The tool according to claim 1, wherein an inner diameter of the annular hub is between 0.5 mm and 3 mm larger than an outer diameter of the corer.

4. The tool according to claim 1, wherein an inner diameter of the rim is at least 5 mm larger than an inner diameter of a path described by the rind cutter upon rotation of the tool, wherein the diameter of the path is to be assessed as seen in a view along a longitudinal axis of the corer.

5. The tool according to claim 1, wherein the annular rim includes two diametrically disposed, radially outwardly extending handles.

6. The tool according to claim 1, wherein at least one of the spokes of the section cutter is formed as a blade that extends parallel to the corer.

7. The tool according to claim 1, wherein the flesh cutter includes a surface that extends helically around the corer, completing substantially one turn, and wherein the section cutter is shaped complementary to said surface of the flesh cutter, such that all spokes thereof may be brought into contact with said surface simultaneously to section a turn of flesh that rests immediately on said surface.

8. The tool according to claim 1, wherein the cutting edge on the second end of the corer includes serrations, and wherein a ratio between an axial length of the serrations of the cutting edge of the corer and the pitch defined by the flesh cutter is in the range of 5.5-7.5, while the number of serrations on the cutting edge is in the range of 22-24.

9. The tool according to claim 1, wherein the corer includes at least one fixing aperture that is provided near the first end thereof,
   wherein the driving member includes at least one generally radially movable locking portion that is configured for locking engagement with the fixing aperture of the corer,
   and wherein the handle includes locking portion control means that are accessible from a side of the handle distal to the corer, and operable to move the locking portion radially inwards and out of engagement with the fixing aperture.

10. The tool according to claim 9, wherein the driving member further comprises:
   a housing, including:
      a grip, and
      a shaft that extends axially through said grip, said shaft having a first end and a second end, the second end of the shaft being configured for connection with the first end of the corer;
   a resilient member that is at least partially disposed within said shaft, and that provides for said movable locking portion,
   wherein the resilient member is operable via an opening at the first end of said shaft to force the position of the locking portion radially inwards, against a spring action provided by the resilient member.

* * * * *